US012715312B2

(12) United States Patent
Rollins et al.

(10) Patent No.: US 12,715,312 B2
(45) Date of Patent: Aug. 25, 2026

(54) STRUCTURAL ASSEMBLY FOR BATTERY STRUCTURE OF ELECTRIC VEHICLE

(71) Applicant: Ford Global Technologies, LLC, Dearborn, MI (US)

(72) Inventors: Scott M. Rollins, Highland, MI (US); Dominic Mario Bertolini, Royal Oak, MI (US); David Doman, Canton, MI (US); Francisco Fernandez-Galindo, Canton, MI (US); John Hammack McCormick, Clawson, MI (US); Jason Luke Sielaff, Brighton, MI (US); Liam E. West, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 897 days.

(21) Appl. No.: 17/980,217

(22) Filed: Nov. 3, 2022

(65) Prior Publication Data

US 2024/0149706 A1 May 9, 2024

(51) Int. Cl.

*B60L 50/64* (2019.01)
*H01M 10/613* (2014.01)
*H01M 10/625* (2014.01)
*H01M 50/249* (2021.01)

(52) U.S. Cl.

CPC ........... *B60L 50/64* (2019.02); *H01M 10/613* (2015.04); *H01M 10/625* (2015.04); *H01M 50/249* (2021.01); *H01M 2220/20* (2013.01)

(58) Field of Classification Search

CPC ... B60L 50/64; H01M 10/613; H01M 10/625; H01M 50/249; H01M 2220/20

See application file for complete search history.

(56) References Cited

U.S. PATENT DOCUMENTS

| | | | | |
|---|---|---|---|---|
| 6,972,544 | B2 | 12/2005 | Seman, Jr. et al. | |
| 10,559,792 | B1 | 2/2020 | Combs | |
| 11,688,910 | B2 * | 6/2023 | Stephens | B60L 50/64 429/96 |
| 12,438,212 | B2 * | 10/2025 | Yoon | |
| 2006/0019155 | A1 | 1/2006 | Seman, Jr. et al. | |
| 2019/0181516 | A1 | 6/2019 | Seki et al. | |
| 2019/0207178 | A1 | 7/2019 | Cao et al. | |

* cited by examiner

*Primary Examiner* — James A Shriver, II
*Assistant Examiner* — Nicholas R. Kandas
(74) *Attorney, Agent, or Firm* — Burris Law, PLLC

(57) ABSTRACT

A structural assembly for a battery structure includes a first shell, a second shell and a cold plate. The first shell includes a first cross member portion providing lateral support for a respective side of a cell stack. The second shell is secured to the first shell to define a unitized structure that houses the cell stack. The second shell includes a second cross member portion providing lateral support for a respective side of the cell stack and is spaced apart along a longitudinal direction of the vehicle relative to the first cross member portion. The cold plate is housed within the unitized structure. Each of the first and second cross member portions includes an outer wall, an inner wall spaced apart from the outer wall, and connecting members that connect the outer wall to the inner wall.

20 Claims, 5 Drawing Sheets

STRUCTURAL ASSEMBLY FOR BATTERY STRUCTURE OF ELECTRIC VEHICLE

FIELD

The present disclosure relates to a structural assembly for a battery structure of an electric vehicle.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. The battery pack typically powers one or more motors to drive a set of wheels using battery arrays. In some electric vehicles, the battery arrays include a structural assembly that surrounds and cools cell stacks, especially for vehicles capable of traveling long distances (e.g., electric vehicles capable of traveling more than 500 miles). As some types of batteries age (e.g., pouch and prismatic battery cells), gas can be generated within the cells. This gas generation causes increasing internal stress. Additionally, battery packs can be subject to various vehicle and impact loads.

The present disclosure addresses these and other issues related to battery arrays in electric vehicles.

SUMMARY

This section provides a general summary of the disclosure and is not a comprehensive disclosure of its full scope or all of its features.

In one form, the present disclosure provides a structural assembly for a battery structure of an electric vehicle. The structural assembly includes a first shell, a second shell, and a cold plate. The first shell extends substantially an entire width of a battery enclosure and includes a first cross member portion providing lateral support for a respective side of a cell stack. The second shell extends substantially the entire width of the battery enclosure and is secured to the first shell to define a unitized structure that houses the cell stack. The second shell includes a second cross member portion providing lateral support for a respective side of the cell stack and is spaced apart along a longitudinal direction of the vehicle relative to the first cross member portion. The cold plate is housed within the unitized structure and is in a heat transfer relationship with the cell stack. Each of the first and second cross member portions includes an outer wall, an inner wall spaced apart from the outer wall, and connecting members that connect the outer wall to the inner wall. The outer wall, the inner wall, and connecting members cooperate with each other to define an internal cavity.

In variations of the structural assembly of the above paragraph, which can be implemented individually or in any combination: the first cross member portion includes internal stiffening members and the second cross member portion includes internal stiffening members; an insulation wall is housed within the unitized structure and disposed between the first cross member portion and the cell stack; a pair of insulation walls are housed within the unitized structure, one insulation wall of the pair of insulation walls disposed between the first cross member portion and the cell stack and the other insulation wall of the pair of insulation walls disposed between the second cross member portion and the cell stack; the first shell further includes a first flange portion and a second flange portion, each of the first and second flange portions defining a first internal cavity and extending in a first direction from a respective end of the first cross member portion; the second shell further includes a third flange portion and a fourth flange portion, each of the third and fourth flange portions defining a second internal cavity and extending in a second direction from a respective end of the second cross member portion, the second direction opposite the first direction; the first flange portion acts as a lid covering the cell stack and the third flange portion acts as a bottom wall supporting the cell stack; each of the first and third flange portions includes internal stiffening members; the first shell is configured to wrap around a first edge of the cell stack and the second shell is configured to wrap around a second edge of the cell stack that is opposite the first edge; and the first shell is configured to wrap around a first edge of the cell stack and a second edge of the cell stack that is opposite the first edge, and wherein the second shell is configured to wrap around a third edge of the cell stack and a fourth edge of the cell stack that is opposite the third edge.

In another form, the present disclosure provides a structural assembly for a battery structure of an electric vehicle. The structural assembly includes a first shell, a second shell, and a cold plate. The first shell extends substantially an entire width of the battery enclosure and includes a first flange portion, a second flange portion, and a first cross member portion providing lateral support for a respective side of the cell stack. Each of the first and second flange portions extending in a first direction from a respective end of the first cross member portion and defines a first internal cavity having first internal stiffening members. The second shell extends substantially the entire width of the battery enclosure and is secured to the first shell to define a unitized structure that houses the cell stack. The second shell includes a third flange portion, a fourth flange portion and a second cross member portion. Each of the third and fourth flange portions extends in a second direction from a respective end of the second cross member portion and defines a second internal cavity having second internal stiffening members. The second direction is opposite the first direction. The second cross member portion is spaced apart along a longitudinal direction of the vehicle relative to the first cross member portion and provides lateral support for a respective side of the cell stack. The cold plate is housed within the unitized structure and is in a heat transfer relationship with the cell stack. Each of the first and second cross member portions includes an outer wall, an inner wall spaced apart from the outer wall, and connecting members that connect the outer wall to the inner wall. The outer wall, the inner wall, and connecting members cooperate with each other to define an internal cavity.

In yet another form, the present disclosure provides a battery structure for an electric vehicle. The battery structure includes a battery housing and a plurality of array structural assemblies disposed within the battery housing. Each array structural assembly is configured to house a cell stack and includes a first shell, a second shell, a pair of insulation walls and a cold plate. The first shell extends substantially an entire width of the battery housing and is configured to wrap around a first edge of the cell stack. The first shell includes a first cross member portion providing lateral support for a respective side of the cell stack. The second shell extends substantially the entire width of the battery housing and is secured to the first shell to define a unitized structure that houses the cell stack. The second shell is configured to wrap around a second edge of the cell stack that is opposite the first edge. The second shell includes a second cross member portion providing lateral support for a respective side of the cell stack. The pair of insulation walls are housed within the unitized structure. One insulation wall of the pair of insulation walls is disposed between the first cross member portion and the cell stack and the other insulation wall of the pair of insulation walls is disposed between the second cross member portion and the cell stack. The cold plate is housed within the unitized structure and is in a heat transfer relationship with the cell stack. The cold plate is disposed between the pair of insulation walls. Each of the first and second cross member portions includes an outer wall, an inner wall spaced apart from the outer wall, and connecting members that connect the outer wall to the inner wall. The outer wall, the inner wall, and connecting members cooperate with each other to define an internal cavity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
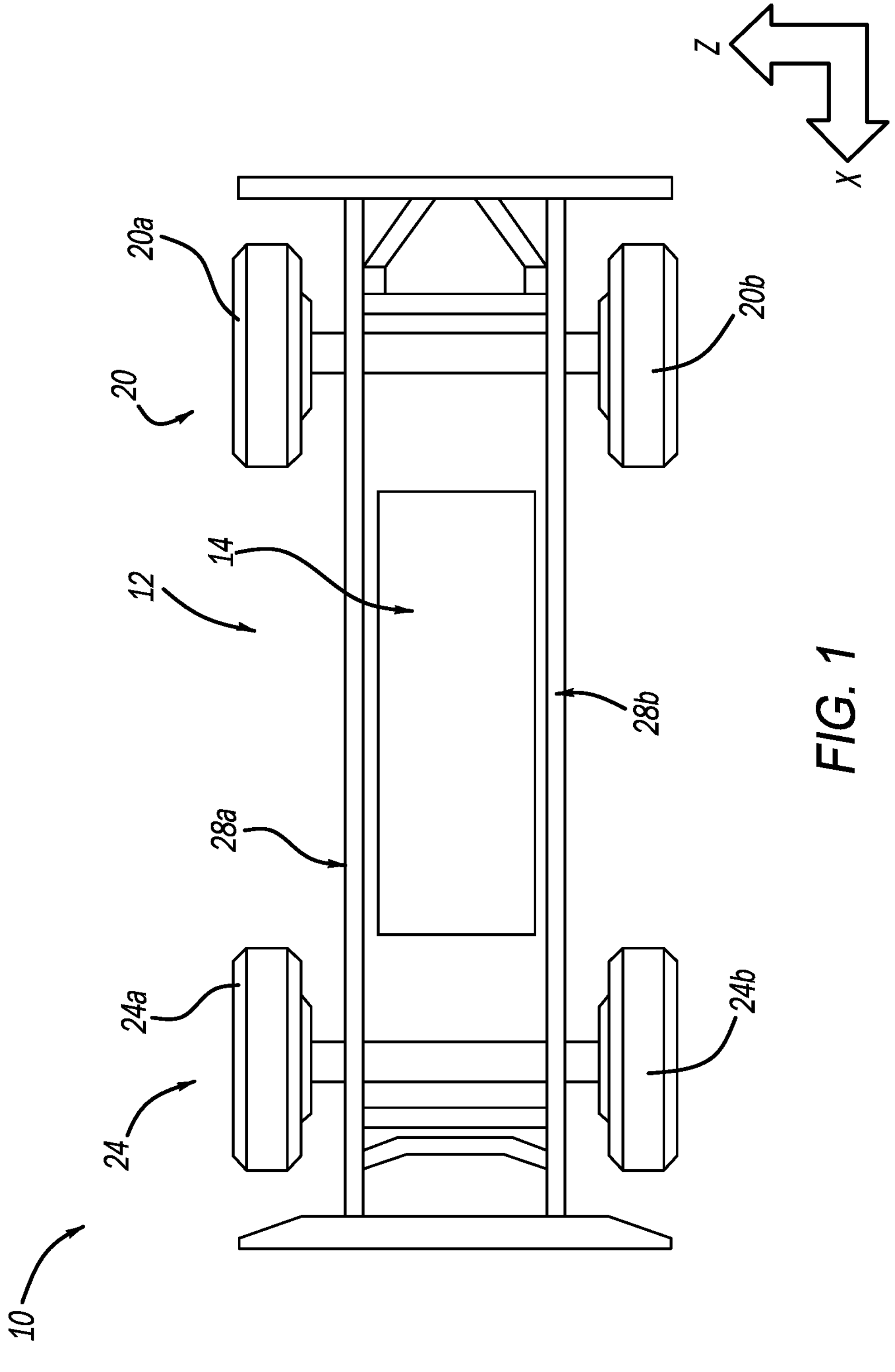
FIG. 1 is a schematic view of a vehicle including a battery housing assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is shown. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery structure or battery housing assembly 14. The vehicle frame 12 is the main supporting structure of the vehicle 10, to which various components are attached either directly or indirectly. The vehicle frame 12 includes opposed longitudinal rails 28*a*, 28*b*. The rails 28*a*, 28*b* are spaced apart from each other and may establish a length of the vehicle frame 12. In the example illustrated, the vehicle 10 is a body on frame vehicle architecture, though other configurations can be used, such as a unibody architecture, for example.

The battery housing assembly 14 powers a rear motor (not shown) to drive rear wheels 20*a*, 20*b* of a set of rear wheels 20 via a rear axle and/or powers a front motor (not shown) to drive front wheels 24*a*, 24*b* of a set of front wheels 24 via a front axle.

Figure 2:
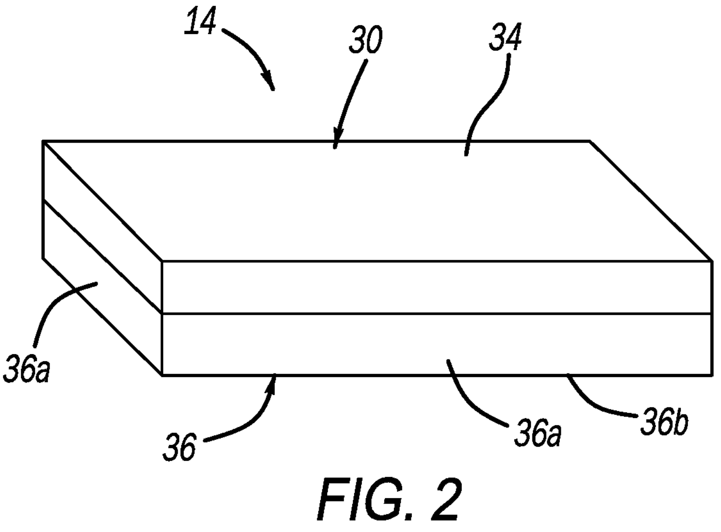
FIG. 2 is a schematic perspective view of the battery housing assembly of FIG. 1.
Figure 3:
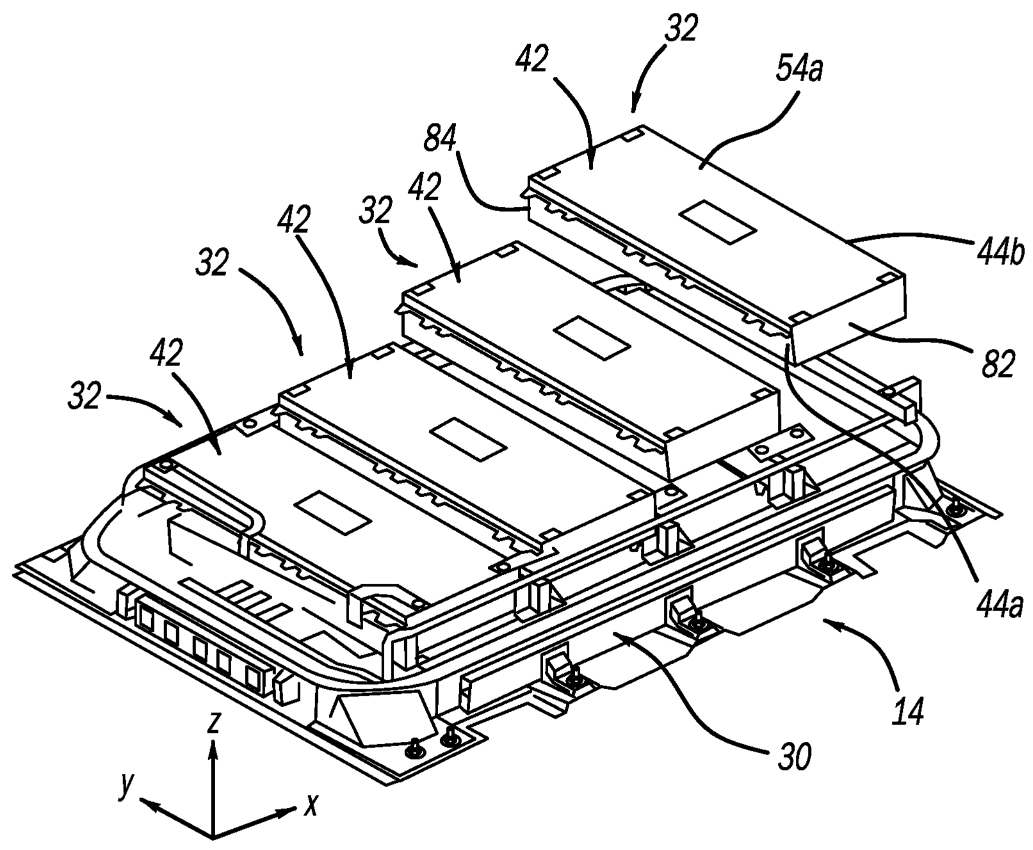
FIG. 3 is another perspective view of the battery housing assembly of FIG. 1 with a lid of the battery housing assembly removed for clarity of illustration.

With reference to FIGS. 2 and 3, the battery housing assembly 14 includes a battery tray or housing 30 and one or more battery arrays 32 (FIG. 3). The battery housing 30 is an enclosure which provides a structural surrounding and sealed compartment for the battery arrays 32 and other battery components such as cooling lines, support brackets, and wiring disposed therein or extending therethrough. The battery housing 30 may be disposed at various locations of the vehicle 10 and is mounted to the vehicle frame 12. In this way, the battery housing 30 is supported by the vehicle frame 12 and is remote from a passenger cabin (not shown) and cargo compartments (not shown) of the vehicle 10, therefore, not occupying space that would otherwise be available for passengers or cargo. The battery housing 30 includes a cover or lid 34, a body 36, and a seal (not shown). The lid 34 may optionally be removably coupled to the body 36 via mechanical fasteners such as bolts or screws (not shown), for example. In this way, the lid 34 may be removed to service the battery arrays 32 disposed within the battery housing 30.

The body 36 includes a plurality of side walls or panels 36*a* and a bottom wall or panel 36*b*. The side walls 36*a* may be manufactured via stamping, for example, and extend in a vertical direction Z. The side walls 36*a* define an outer boundary of the battery housing 30 and are secured to each other via welding or an adhesive, for example. The bottom wall 36*b* supports the battery arrays 32 disposed within the battery housing 30 and is secured to lower portions of the side walls 36*a*. The seal is disposed around a periphery of the body 36 and is engaged with the body 36 and the lid 34. In this way, fluids, debris and other materials are inhibited from entering into the battery housing 30.

Figure 4A:
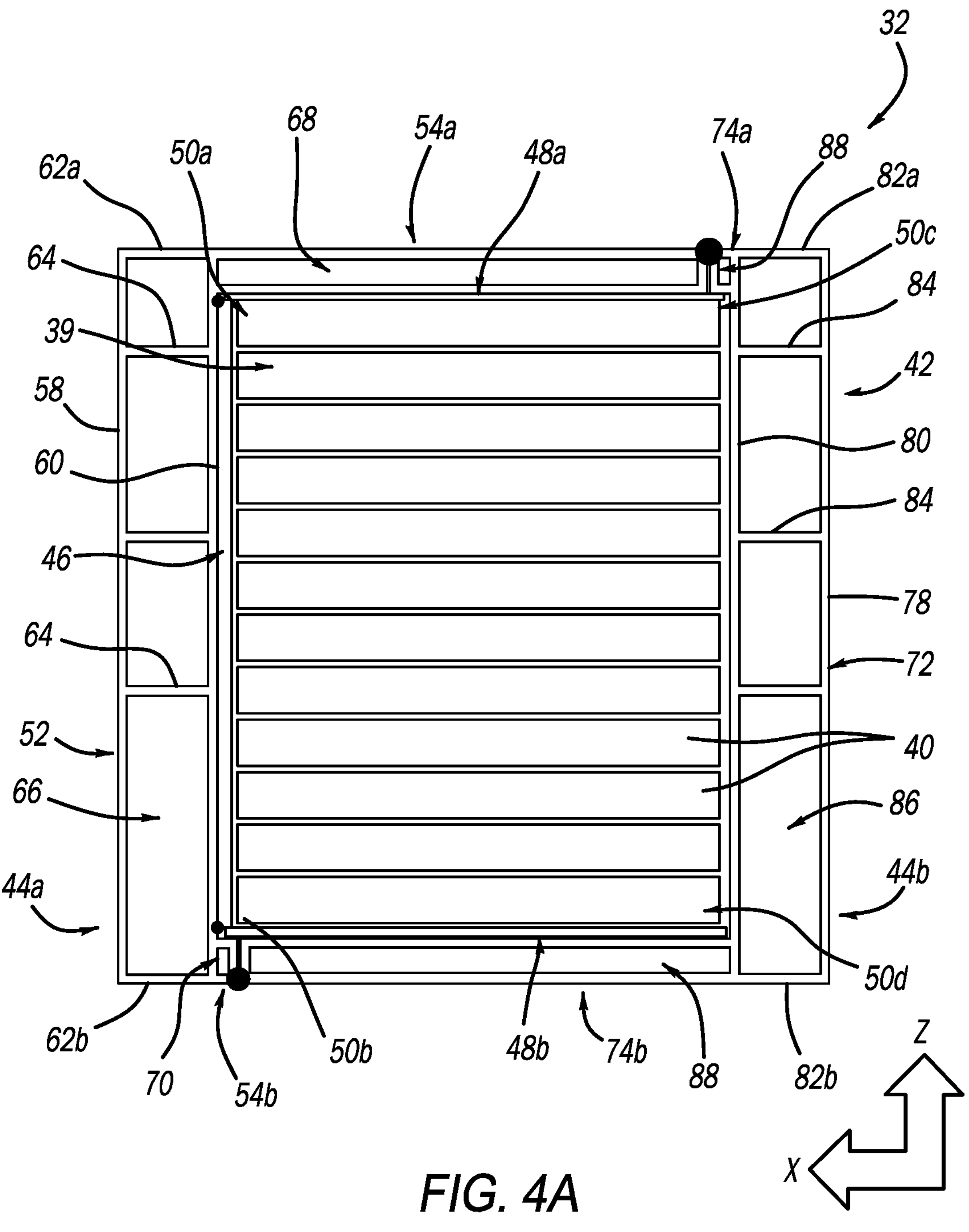
FIG. 4A is a cross-sectional view of a battery array of the battery housing assembly of FIG. 1.

With additional reference to FIG. 4A, each battery array 32 may be rechargeable and may include one or more cell stacks 39 formed by battery cells 40 (e.g., lithium-ion batteries such as those in which the cell components are enclosed in an aluminum-coated plastic film or any other suitable electrical power storage units). In the example illustrated, the cell stack 39 is formed by battery cells 40 stacked on each other in a vertical arrangement. In some forms, the cell stack may be formed by battery cells arranged in a side-by-side configuration. Each battery array 32 comprises a structural assembly 42 surrounding and supporting the cell stack 39. In some forms, the battery arrays 32 are in fluid communication with each other via connecting lines (not shown). In this way, fluid such as glycol, for example, is allowed to flow through the structural assembly 42 of each battery array 32, thereby cooling the battery cells 40.

Each structural assembly 42 is in the form of a modular structure that can be installed within and removed from the battery housing 30. Each structural assembly 42 also spans substantially an entire width of the battery housing 30 and is configured to transfer loads from one side of the battery housing 30 to an opposite side of the battery housing 30, for example, during certain side impacts. Stated differently, each modular structural assembly 42 is configured to house the battery cells 40 and transfer loads away from the battery cells 40 during certain side impacts.

Each structural assembly 42 may be removably coupled to the battery housing 30 and includes a pair of shells 44*a*, 44*b*, a cold plate 46, and a pair of insulation walls 48*a* 48*b*. In the example illustrated, the shell 44*a* extends substantially an entire width of the battery housing 30 and is configured to wrap around left upper and left lower edges 50*a*, 50*b* of the cell stack 39. The shell 44*a* is made of a metal material such as aluminum, for example, and includes a cross member portion 52 and a pair of flanges 54*a*, 54*b*.

The cross member portion 52 supports a respective side of the cell stack 39 and includes a thickness that is greater than a thickness of the cold plate 46 and a thickness of each insulation wall 48*a*, 48*b*. The cross member portion 52 extends upward past the cell stack 39, the cold plate 46 and one insulation wall 48*a* of the pair of insulation walls 48*a*, 48*b*, and extends downward past the cell stack 39, the cold plate 46 and the other insulation wall 48*b* of the pair of insulation walls 48*a*, 48*b*. The cross member portion 52 includes an outer wall 58, an inner wall 60, connecting members 62*a*, 62*b* and internal stiffening members 64. The outer wall 58 extends in a vertical direction and defines an outer boundary of the battery array 32. The inner wall 60 is spaced apart from the outer wall 58 and also extends in a vertical direction. The connecting member 62*a* extends in a horizontal direction and connects the upper section of the inner wall 60 with an upper section of the outer wall 58. Similarly, the connecting member 62*b* extends in a horizontal direction and connects the lower section of the inner wall 60 with the lower section of the outer wall 58. The outer wall 58, the inner wall 60 and the connecting members 62*a*, 62*b* cooperate to define an internal cavity 66. The internal stiffening members 64 are disposed within the internal cavity 66 and extend in a horizontal direction from the outer wall 58 to the inner wall 60. In some forms, one or more internal stiffening member 64 extend in an oblique direction, in addition to, or instead of, the horizontal direction.

The pair of flanges 54*a*, 54*b* extend in a horizontal direction from the inner wall 60 of the shell 44*a* toward the shell 44*b*. The pair of flanges 54*a*, 54*b* also have a thickness that is less than the thickness of the cross member portion 52. The flange 54*a* extends from an upper end of the inner wall 60 and is flush with the connecting member 62*a*. The flange 54*a* also extends a further distance toward the shell 44*b* than the flange 54*b*. In this way, the flange 54*a* acts as a lid covering the cell stack 39. The flange 54*a* is secured to the shell 44*b* and defines an internal cavity 68. In the example illustrated, the flange 54*a* is welded to the shell 44*b*. The flange 54*b* extends from a lower end of the inner wall 60 and is flush with the connecting member 62*b*. The flange 54*b* is also secured to the shell 44*b* and defines an internal cavity 70.

In the example illustrated, the shell 44*b* extends substantially an entire width of the battery housing 30 and is configured to wrap around right upper and right lower edges 50*c*, 50*d* of the cell stack 39. The shell 44*b* is made of a metal material such as aluminum, for example, and is secured to the shell 44*a* to form a unitized structure that houses the cell stack 39, the cold plate 46, and the pair of insulation walls 48*a* 48*b*. The shell 44*b* includes a cross member portion 72 and a pair of flanges 74*a*, 74*b*.

The cross member portion 72 supports a respective side of the cell stack 39 and includes a thickness that is greater than a thickness of the cold plate 46 and a thickness of each insulation wall 48*a*, 48*b*. The cross member portion 72 may have a thickness that is substantially equal to the thickness of the cross member portion 52 of the shell 44*a*. The cross member portion 72 extends upward past the cell stack 39, the cold plate 46 and one insulation wall 48*a* of the pair of insulation walls 48*a*, 48*b*, and extends downward past the cell stack 39, the cold plate 46 and the other insulation wall 48*b* of the pair of insulation walls 48*a*, 48*b*. The cross member portion 72 includes an outer wall 78, an inner wall 80, connecting members 82*a*, 82*b* and internal stiffening members 85. The outer wall 78 extends in a vertical direction and defines an outer boundary of the battery array 32. The inner wall 80 is spaced apart from the outer wall 78 and also extends in a vertical direction. The connecting member 82*a* extends in a horizontal direction and connects the upper section of the inner wall 80 with an upper section of the outer wall 78. Similarly, the connecting member 82*b* extends in a horizontal direction and connects the lower section of the inner wall 80 with the lower section of the outer wall 78. The outer wall 78, the inner wall 80 and the connecting members 82*a*, 82*b* cooperate to define an internal cavity 86. The internal stiffening members 85 are disposed within the internal cavity 86 and extend in a horizontal direction from the outer wall 78 to the inner wall 80. In some forms, one or more internal stiffening members 85 extend in an oblique direction, in addition to, or instead of, the horizontal direction.

The pair of flanges 74*a*, 74*b* extend in a horizontal direction from the inner wall 80 of the shell 44*b* toward the shell 44*a*. The pair of flanges 74*a*, 74*b* also have a thickness that is less than the thickness of the cross member portion 72. The flange 74*a* extends from an upper end of the inner wall 80 and is flush with the connecting member 82*a*. The flange 74*a* is also welded to the flange 54*a* of the shell 44*a*, thus, inhibiting fluid and debris from entering into the unitized structure. The flange 74*b* extends from a lower end of the inner wall 80 and is flush with the connecting member 82*b*. The flange 74*b* is also welded to the flange 54*b* of the shell 44*a*, thus, further inhibiting fluid and debris from entering into the unitized structure. The flange 74*b* also extends a further distance toward the shell 44*a* than the flange 74*a*. In this way, the flange 74*b* acts as a bottom wall supporting the cell stack 39. The flanges 74*a*, 74*b* each define an internal cavity 88 that may have vertical stiffening members (not shown) disposed therein.

In the example illustrated, each shell 44*a*, 44*b* is a single component that extends substantially an entire width of the battery structure 14. In some configurations, each shell 44*a*, 44*b* is made of two or more adjacent components that together extend substantially an entire width of the battery structure 14 and that are each secured to the bottom wall 36*b* of the body 36. In some forms of the above configuration, the two or more adjacent components of each shell 44*a*, 44*b* may be separate (distinct) from each other. In other forms of the above configuration, the two or more adjacent components of each shell 44*a*, 44*b* may be joined to each other by welding, adhesives, fasteners, or any other suitable attachment means.

The cold plate 46 may be manufactured via a stamping process, for example, and is made of a metal material. In some forms, the cold plate 46 may be manufactured via other manufacturing processes such as an extrusion process, for example. The cold plate 46 is in a heat transfer relationship with the cell stack 39. In the example illustrated, the cold plate 46 is positioned between the cross member portion 52 and the cell stack 39. In some forms, the cold plate 46 may be disposed between the cell stack 39 and the flange 74*b*, between the cell stack 39 and the cross member portion 72, and/or disposed between the cell stack 39 and the flange 54*a*. In the example illustrated, the cold plate 46 is joined to the cross member portion 52 of the shell 44*a* by welding. In some forms, the cold plate 46 is separate from the cross member portion 52. Heat generated by the cell stack 39 is transferred to the cold plate 46. As used herein, the term "heat transfer relationship" should be construed to mean an arrangement in which heat from the cell stack 39 is directly or indirectly transferred to one or more cold plates of the structural assembly 42 via thermal conduction.

The pair of insulation walls 48*a*, 48*b* may be disposed within the unitized structure formed by the shells 44*a*, 44*b*. The insulation walls 48*a*, 48*b* are formed of a thermally insulating material. The insulation walls 48*a*, 48*b* extend in a horizontal direction and have a thickness that is less than the thickness of the cold plate 46. The insulation wall 48*a* is positioned between the flange 54*a* and the cell stack 39 and insulates an upper portion of the cell stack 39. The insulation wall 48*b* is positioned between the flange 74*b* and the cell stack 39 and insulates a lower portion of the cell stack 39. In some forms, one insulation wall (not shown) may be positioned between the cross member portion 52 of the of the shell 44*a* and the cell stack 39, and another insulation wall (not shown) may be positioned between the cross member portion 72 of the shell 44*b* and the cell stack 39.

Referring back to FIG. 3, a first end wall 82 is oriented vertically and is secured to the structural assembly 42. In one example, the first end wall 82 is secured to one or both of the shells 44*a*, 44*b*. The first end wall 82 covers and supports a first end of the cell stack 39 (FIG. 4A). Similarly, a second end wall 84 that is opposite the first end wall 82 is oriented vertically and is secured to the structural assembly 42. In one example, the second end wall 84 is secured to one or both of the shells 44*a*, 44*b*. The second end wall 84 covers and supports a second end of the cell stack 39 (FIG. 4A) that is opposite the first end of the cell stack 39 (FIG. 4A). The end walls 82, 84 are secured to the structural assembly 42 such that the end walls 82, 84 and the structural assembly 42 cooperate to form a structural surrounding and sealed compartment for the cell stack 39 (FIG. 4A). In one example, the first and second end walls 82, 84 are secured to gussets (not shown), which are, in turn, secured to the battery housing 30.

Figure 4B:
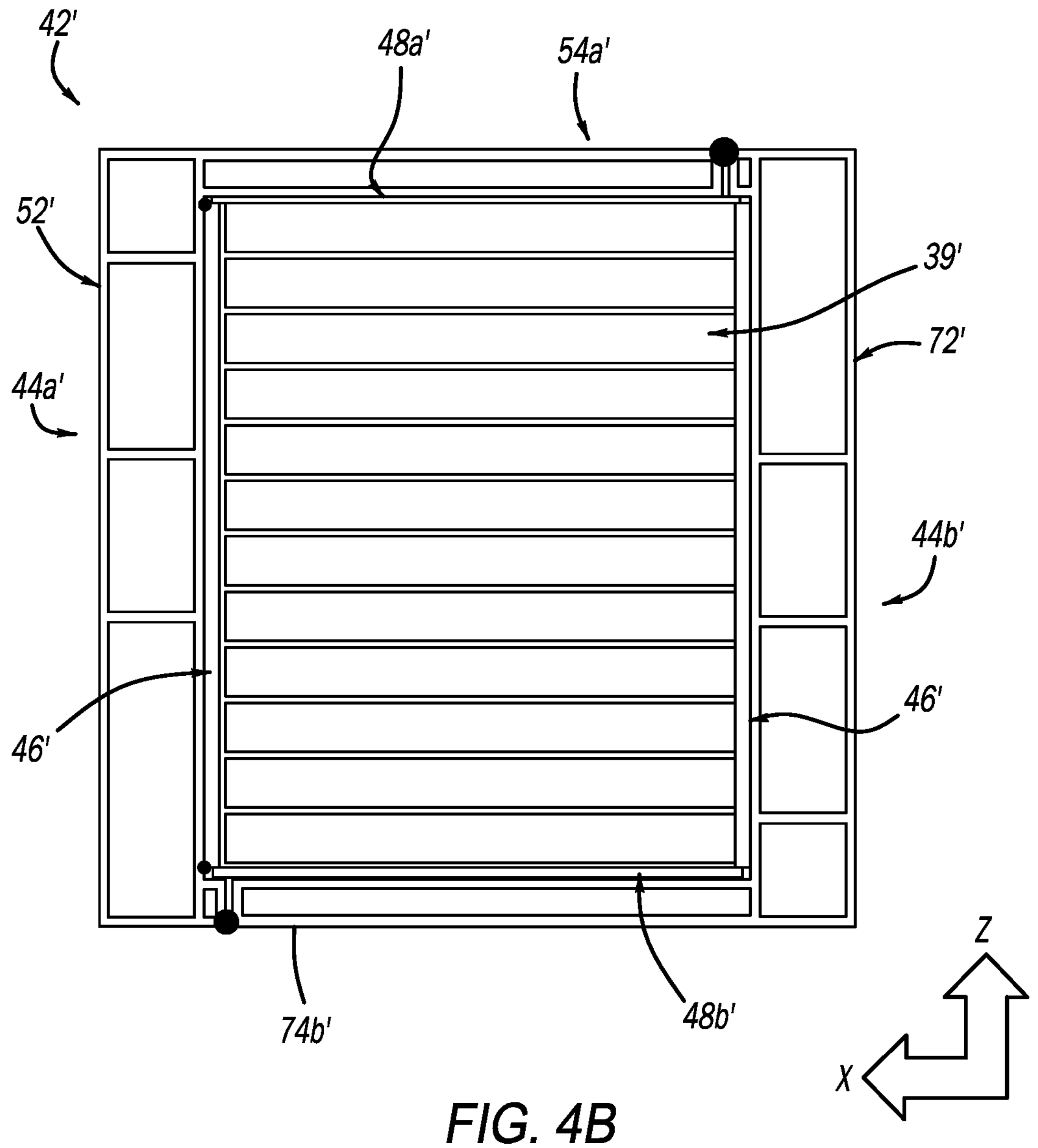
FIG. 4B is a cross-sectional view of an alternate battery array that can be incorporated into the battery housing assembly of FIG. 1 according to the principles of the present disclosure.

In an alternate example illustrated in FIG. 4B, the structural assembly 42' is similar to the structural assembly 42 (FIG. 4A) except otherwise shown and described herein. Similar features are denoted with similar but primed reference numerals and only differences are described in detail. The structural assembly 42' includes a pair of cold plates 46' and a pair of insulation walls 48*a*', 48*b*' disposed within the unitized structure formed by the shells 44*a*', 44*b*'. One cold plate 46' of the pair of cold plates 46' is positioned between the cross member portion 52' of the shell 44*a*' and the cell stack 39', and may be welded to the cross member portion 52' of the shell 44*a*'. Similarly, the other cold plate 46' of the pair of cold plates 46' is positioned between the cross member portion 72' of the shell 44*b*' and the cell stack 39', and may be welded to the cross member portion 72' of the shell 44*b*'. The insulation wall 48*a*' is positioned between the flange 54*a*' of the shell 44*a*' and the cell stack 39' and the insulation wall 48*b*' is positioned between the flange 74*b*' of the shell 44*b*' and the cell stack 39'.

Returning to FIG. 4A, the structural assembly 42 of the present disclosure provides multiple functions such as load paths, heat transfer, and fluid flow paths. In one example, the cross members 50 of each structural assembly 42 is configured to house the battery cells 40 and transfer loads across the battery housing 30 away from the battery cells 40 during certain side impacts. In some forms, the structural assembly 42 may be additively manufactured in which one or more walls include an internal lattice structure to provide fluid flow paths for cooling fluid flowing through the structural assembly 42.

Figure 5:
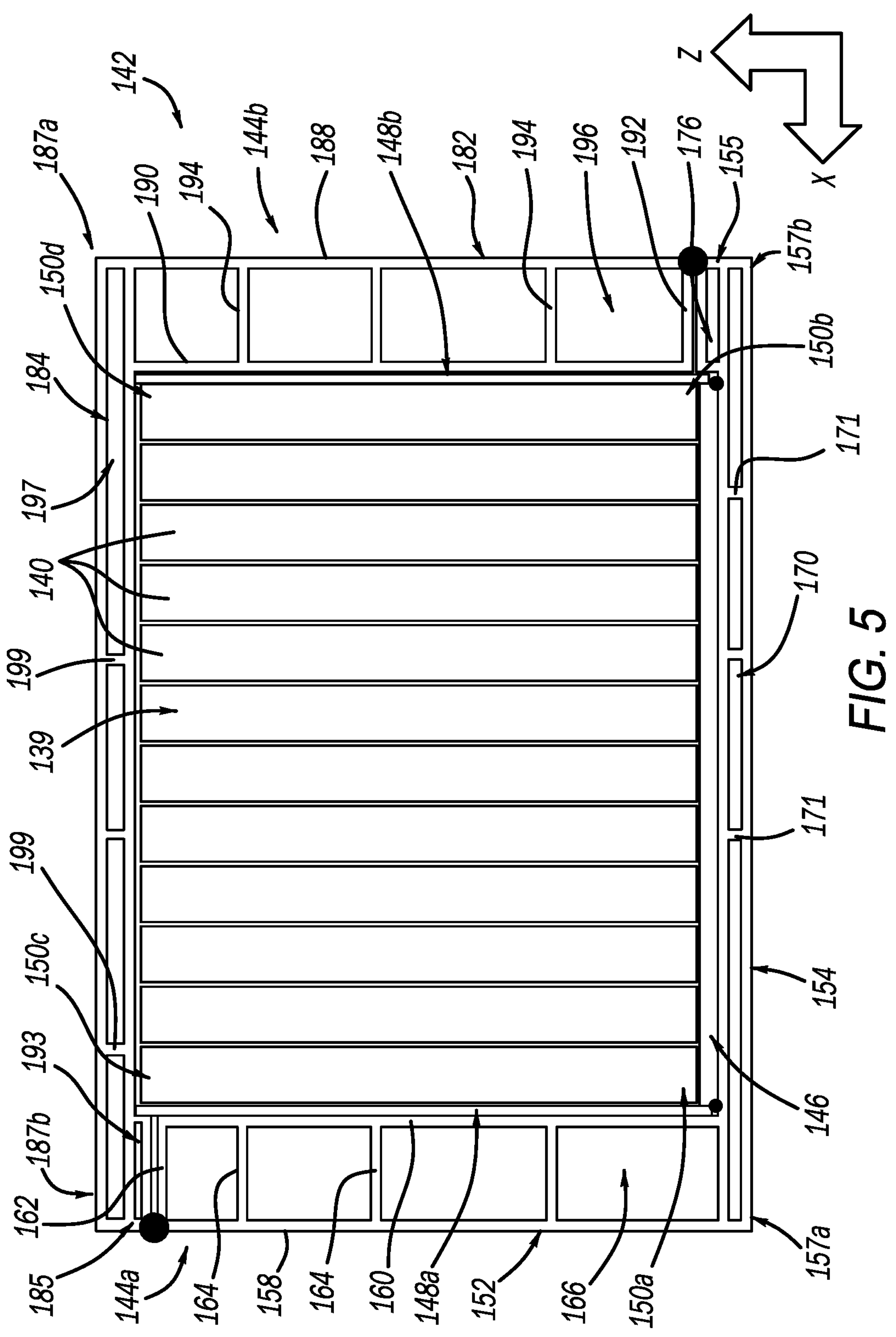
FIG. 5 is a cross-sectional view of yet another alternate battery array that can be incorporated into the battery housing assembly of FIG. 1 according to the principles of the present disclosure.

With reference to FIG. 5, a structural assembly 142 is illustrated. The structural assembly 142 may be incorporated into the battery housing assembly 14 described above instead of the structural assembly 42. The structure and function of the structural assembly 142 may be similar or identical to the structural assembly 42 described above, apart for any differences noted below.

The structural assembly 142 may be removably coupled to the battery housing 30 described above and includes a pair of shells 144*a*, 144*b*, a cold plate 146, and a pair of insulation walls 148*a* 148*b*. In the example illustrated, the shell 144*a* is configured to wrap around left lower and right lower edges 150*a*, 150*b* of the cell stack 139. In the example illustrated, battery cells 140 of the cell stack 139 are arranged in a side-by-side configuration. In an alternative form, not shown, the cells 140 can be arranged in a stacked configuration, similar to FIG. 4A. The shell 144*a* includes a cross member portion 152, a lower wall 154 and a flange 155.

The cross member portion 152 supports a respective side of the cell stack 139 and includes a thickness that is greater than a thickness of the cold plate 146 and greater than a thickness of each insulation wall 148*a*, 148*b*. The cross member portion 152 extends upward from an end 157*a* of the lower wall 154 and is welded to the shell 144*b*. The cross member portion 152 includes an outer wall 158, an inner wall 160, a connecting member 162 and internal stiffening members 164. The outer wall 158 extends in a vertical direction and defines an outer boundary of the structural assembly 142. The inner wall 160 is spaced apart from the outer wall 158 and also extends in a vertical direction. The connecting member 162 extends in a horizontal direction and connects the upper section of the inner wall 160 with an upper section of the outer wall 158. The outer wall 158, the inner wall 160 and the connecting member 162 cooperate to define an internal cavity 166. The internal stiffening members 164 are disposed within the internal cavity 166 and extend in a horizontal direction from the outer wall 158 to the inner wall 160.

The lower wall 154 extends in a horizontal direction and acts as a bottom wall supporting the cell stack 139 and the cold plate 146. The lower wall 154 has a thickness that is less than the thickness of the cross member portion 152. The lower wall 154 extends longitudinally past the left lower edge 150*a* of the cell stack 139 and extends longitudinally past the right lower edge 150*b* of the cell stack 139. The lower wall 154 also includes an internal cavity 170 having vertical stiffening members 171 disposed therein. The flange 155 extends upward from a second end 157*b* of the lower wall 154 that is opposite the first end 157*a* of the lower wall 154. The cross member portion 152 extends further upward from the lower wall 154 than the flange 155. The flange 155 is welded to the shell 144*b* and has a thickness that is substantially equal to the thickness of the cross member portion 152. The flange 155 also defines an internal cavity 176 that may have internal stiffening members (not shown) disposed therein.

The shell 144*b* is secured to the shell 144*a* to form a unitized structure that houses the cold plate 146 and the pair of insulation walls 148*a*, 148*b*. The shell 144*b* includes a cross member portion 182, an upper wall 184 and a flange 185. The cross member portion 182 supports a respective side of the cell stack 139 and includes a thickness that is greater than a thickness of the cold plate 146 and greater than a thickness of each insulation wall 148*a*, 148*b*. The cross member portion 182 extends downward from an end 187*a* of the upper wall 184 and is welded to the flange 155 of the shell 144*a*. The cross member portion 182 includes an outer wall 188, an inner wall 190, a connecting member 192 and internal stiffening members 194. The outer wall 188 extends in a vertical direction and defines an outer boundary of the structural assembly 142. The inner wall 190 is spaced apart from the outer wall 188 and also extends in a vertical direction. The connecting member 192 extends in a horizontal direction and connects a lower section of the inner wall 190 with a lower section of the outer wall 188. The outer wall 188, the inner wall 190 and the connecting member 192 cooperate to define an internal cavity 196. The internal stiffening members 194 are disposed within the internal cavity 196 and extend in a horizontal direction from the outer wall 188 to the inner wall 190.

The upper wall 184 extends in a horizontal direction and acts as a lid covering the cell stack 139. The upper wall 184 has a thickness that is less than the thickness of the cross member portion 182. The upper wall 184 extends longitudinally past a left upper edge 150*c* of the cell stack 139 and extends longitudinally past a right upper edge 150*d* of the cell stack 139. The upper wall 184 also includes an internal cavity 197 having vertical stiffening members 199 disposed therein. The flange 185 extends downward from a second end 187*b* of the upper wall 184 that is opposite the first end 187*a* of the upper wall 184. The cross member portion 182 extends further downward from the upper wall 184 than the flange 185. The flange 185 is welded to the cross member portion 152 of the shell 144*a* and has a thickness that is substantially equal to the thickness of the cross member portion 182. The flange 155 also defines an internal cavity 193 that may have internal stiffening members (not shown) disposed therein.

The cold plate 146 is disposed within the unitized structure formed by the shells 144*a*, 144*b* between the cell stack 139 and the lower wall 154 of the shell 144*a*. The structure and function of the cold plate 146 may be similar or identical to that of the cold plate 46 described above, and therefore, will not be described again in detail. The pair of insulation walls 148*a*, 148*b* are disposed within the unitized structure formed by the shells 144*a*, 144*b*. That is, in the example illustrated, the insulation wall 148*a* is positioned between the cross member portion 152 of the shell 144*a* and the cell stack 139, and the insulation wall 148*b* is positioned between the cross member portion 182 of the shell 144*b* and the cell stack. The structure and function of the insulation walls 148*a*, 148*b* may be similar or identical to that of the insulation walls 48*a*, 48*b* described above, and therefore, will not be described again in detail.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a battery structure of an electric vehicle, the structural assembly comprising:

a first shell extending substantially an entire width of a battery enclosure and comprising a first cross member portion and a first flange portion, the first cross member portion providing lateral support for a respective side of a cell stack, the first flange portion extending in a first direction from a first surface of the first cross member portion towards the second shell;

a second shell extending substantially the entire width of the battery enclosure and secured to the first shell to define a unitized structure that houses the cell stack, the second shell comprising a second cross member portion and a third flange portion, the second cross member portion providing lateral support for a respective side of the cell stack and spaced apart along a longitudinal direction of the vehicle relative to the first cross member portion, the third flange portion extending in a second direction opposite the first direction from a second surface of the second cross member portion towards the first cross member portion; and a cold plate housed within the unitized structure and in a heat transfer relationship with the cell stack, wherein each of the first and second cross member portions comprises an outer wall, an inner wall spaced apart from the outer wall, and connecting members that connect the outer wall to the inner wall, the outer wall, the inner wall, and connecting members cooperate with each other to define an internal cavity.

2. The structural assembly of claim 1, wherein the first cross member portion includes internal stiffening members and the second cross member portion includes internal stiffening members.

3. The structural assembly of claim 2, further comprising an insulation wall housed within the unitized structure and disposed between the first cross member portion and the cell stack.

4. The structural assembly of claim 1, further comprising an insulation wall housed within the unitized structure and disposed between the first cross member portion and the cell stack.

5. The structural assembly of claim 1, further comprising a pair of insulation walls housed within the unitized structure, one insulation wall of the pair of insulation walls disposed between the first cross member portion and the cell stack and the other insulation wall of the pair of insulation walls disposed between the second cross member portion and the cell stack.

6. The structural assembly of claim 1, wherein:

the first shell further comprises a second flange portion, each of the first and second flange portions defining a first internal cavity and extending in the first direction from a respective end of the first cross member portion; and the second shell further comprises a fourth flange portion, each of the third and fourth flange portions defining a second internal cavity and extending in the second direction from a respective end of the second cross member portion, the second direction opposite the first direction.

7. The structural assembly of claim 6, wherein the first flange portion acts as a lid covering the cell stack and the third flange portion acts as a bottom wall supporting the cell stack.

8. The structural assembly of claim 7, wherein each of the first and third flange portions includes internal stiffening members.

9. The structural assembly of claim 1, wherein the first shell is configured to wrap around a first edge of the cell stack and the second shell is configured to wrap around a second edge of the cell stack that is opposite the first edge.

10. The structural assembly of claim 1, wherein the first shell is configured to wrap around a first edge of the cell stack and a second edge of the cell stack that is opposite the first edge, and wherein the second shell is configured to wrap around a third edge of the cell stack and a fourth edge of the cell stack that is opposite the third edge.

11. A structural assembly for a battery structure of an electric vehicle, the structural assembly comprising:

a first shell extending substantially an entire width of the battery enclosure and comprising a first flange portion, a second flange portion, and a first cross member portion providing lateral support for a respective side of the cell stack, each of the first and second flange portions extending in a first direction from a respective end of the first cross member portion and defining a first internal cavity having first internal stiffening members, the first flange portion extending in the first direction from a first surface of the first cross member portion;

a second shell extending substantially the entire width of the battery enclosure and secured to the first shell to define a unitized structure that houses the cell stack, the second shell comprising a third flange portion, a fourth flange portion and a second cross member portion, each of the third and fourth flange portions extending in a second direction from a respective end of the second cross member portion and defining a second internal cavity having second internal stiffening members, the second direction is opposite the first direction, the second cross member portion spaced apart along a longitudinal direction of the vehicle relative to the first cross member portion and providing lateral support for a respective side of the cell stack, the third flange portion extending in the second direction from a second surface of the second cross member portion; and a cold plate housed within the unitized structure and in a heat transfer relationship with the cell stack, wherein each of the first and second cross member portions comprises an outer wall, an inner wall spaced apart from the outer wall, and connecting members that connect the outer wall to the inner wall, the outer wall, the inner wall, and connecting members cooperate with each other to define an internal cavity.

12. The structural assembly of claim 11, wherein the first flange portion extends further in the first direction than the second flange portion, and wherein the third flange portion extends further in the second direction than the fourth flange portion.

13. The structural assembly of claim 11, wherein the first flange portion acts as a lid covering the cell stack and the third flange portion acts as a bottom wall supporting the cell stack.

14. The structural assembly of claim 13, wherein each of the first and second cross member portions has a first thickness and each of the first and third flange portions has a second thickness, the first thickness greater than the second thickness.

15. The structural assembly of claim 11, wherein the first and second flange portions extend toward the second cross member portion and the third and fourth flange portions extends toward the first cross member portion.

16. The structural assembly of claim 11, wherein the cold plate is disposed between the cell stack and the first flange portion acting as a bottom wall supporting the cell stack.

17. The structural assembly of claim 11, further comprising an insulation wall housed within the unitized structure and disposed between the first cross member portion and the cell stack.

18. The structural assembly of claim 11, further comprising a pair of insulation walls housed within the unitized structure, one insulation wall of the pair of insulation walls disposed between the first cross member portion and the cell stack and the other insulation wall of the pair of insulation walls disposed between the second cross member portion and the cell stack.

19. The structural assembly of claim 11, further comprising:

a pair of insulation walls housed within the unitized structure, one insulation wall of the pair of insulation walls disposed between the first cross member portion and the cell stack and the other insulation wall of the pair of insulation walls disposed between the second cross member portion and the cell stack; and the cold plate is disposed between the cell stack and the first flange portion acting as a bottom wall supporting the cell stack.

20. A battery structure for an electric vehicle, the battery structure comprising:

a battery housing; and a plurality of array structural assemblies disposed within the battery housing, each array structural assembly configured to house a cell stack, each array structural assembly comprising:

a first shell extending substantially an entire width of the battery housing and configured to wrap around a first edge of the cell stack, the first shell comprising a first cross member portion providing lateral support for a respective side of the cell stack and a first flange portion extending in a first direction from a first surface of the first cross member portion towards the second shell;

a second shell extending substantially the entire width of the battery housing and secured to the first shell to define a unitized structure that houses the cell stack, the second shell configured to wrap around a second edge of the cell stack that is opposite the first edge, the second shell comprising a second cross member portion providing lateral support for a respective side of the cell stack and a second flange portion extending in a second direction from a second surface of the second cross member portion towards the first shell;

a pair of insulation walls housed within the unitized structure, one insulation wall of the pair of insulation walls disposed between the first cross member portion and the cell stack and the other insulation wall of the pair of insulation walls disposed between the second cross member portion and the cell stack; and a cold plate housed within the unitized structure and in a heat transfer relationship with the cell stack, the cold plate disposed between the pair of insulation walls, wherein each of the first and second cross member portions comprises an outer wall, an inner wall spaced apart from the outer wall, and connecting members that connect the outer wall to the inner wall, the outer wall, the inner wall, and connecting members cooperate with each other to define an internal cavity.

* * * * *